US012689702B2

(12) United States Patent
Bhattacharya et al.

(10) Patent No.: US 12,689,702 B2
(45) Date of Patent: Jul. 21, 2026

(54) METHOD AND SYSTEM FOR RECOLORING A PRODUCT

(71) Applicant: Tata Consultancy Services Limited, Mumbai (IN)

(72) Inventors: Gaurab Bhattacharya, Bangalore (IN); Jayavardhana Rama Gubbi Lakshminarasimha, Bangalore (IN); Bagya Lakshmi Vasudevan, Chennai (IN); Gaurav Sharma, Delhi (IN); Kuruvilla Abraham, Delhi (IN); Arpan Pal, Kolkata (IN); Balamuralidhar Purushothaman, Bangalore (IN); Nikhil Kilari, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 245 days.

(21) Appl. No.: 18/740,734

(22) Filed: Jun. 12, 2024

(65) Prior Publication Data

US 2024/0422281 A1    Dec. 19, 2024

(30) Foreign Application Priority Data

Jun. 15, 2023    (IN) .............................. 202321040918

(51) Int. Cl.
H04N 1/60 (2006.01)
G06T 7/11 (2017.01)
(Continued)

(52) U.S. Cl.
CPC ................. H04N 1/60 (2013.01); G06T 7/11 (2017.01); G06T 7/90 (2017.01); G06V 10/44 (2022.01); G06V 10/56 (2022.01); G06V 10/762 (2022.01)

(58) Field of Classification Search
CPC .... H04N 1/60; G06T 7/11; G06T 7/90; G06T 11/10; G06T 2211/441; G06V 10/44; G06V 10/56; G06V 10/762; G06N 3/045
See application file for complete search history.

(56) References Cited

U.S. PATENT DOCUMENTS 11,615,559 B2    3/2023    Panetta et al.
2021/0233287 A1*    7/2021    Kumar .................... G06T 11/10
(Continued)

FOREIGN PATENT DOCUMENTS

IN        202221034940        12/2023

OTHER PUBLICATIONS

Bhattacharya et al: "SwatchNet: Small Components Aware Attention for Fashion Product Recoloring" Jun. 18-23, 2023; 2023 Internationa Joint Conference on Neural Network (IJCNN); pp. 1-8. (Year: 2023).*

*Primary Examiner* — Siamak Harandi
(74) *Attorney, Agent, or Firm* — Finnegan, Henderson, Farabow, Garrett & Dunner, LLP

(57) ABSTRACT

State of the art techniques have challenges for recoloring a product, which includes non-realistic images, incorrect color mapping, structural distortion, color spilling into background, and in handling multi-color, multi-apparel and multi-product scenario images. Embodiments of the present disclosure provide a method and system for recoloring a product using a dual attention (DA) U-Net based on a generative adversarial network (GAN) framework to generate a recolored product with a target color from an input image. The disclosed DAU-Net enables recoloring (i) a single-color in a single-product scenario, (ii) a plurality of colors in a single-product scenario, and (iii) multi-product scenario with a human model. The DAU net uses (i) a product components aware feature (PCAF) extraction to generate feature representations comprising information of (Continued)

the target color with finer details, and (b) a critical feature selection (CFS) mechanism applied on the feature representation, to generate enhanced feature representations.

18 Claims, 10 Drawing Sheets

(51) Int. Cl.
  *G06T 7/90*          (2017.01)
  *G06V 10/44*         (2022.01)
  *G06V 10/56*         (2022.01)
  *G06V 10/762*        (2022.01)

(56)                References Cited

U.S. PATENT DOCUMENTS

| | | | |
|---|---|---|---|
| 2022/0237830 A1 | 7/2022 | Khodadadeh et al. | |
| 2023/0055204 A1* | 2/2023 | Ungureanu | ............. G06T 11/00 |
| 2023/0410390 A1 | 12/2023 | Vasudevan et al. | |

* cited by examiner

300

receiving, (a) an input image of a product, (b) a target color for generating a recolored product, and (c) a product mask indicating a relevant product to be recolored in a multi-product scenario, wherein the product mask is received only in the multi-product scenario

302 determining, by using a clustering-based approach, one or more colors in the received input image

304 obtaining, by using a segmentation-based approach, a segmentation region for each of the one or more colors, wherein the segmentation region comprises a plurality of product segments with associated product segment mask

306 selecting, by using product mask, a product segment from among the plurality of product segments associated with the segmentation region, for the multi-product scenario, wherein for a single-color product and for a multi-color product in a single-product scenario the product segment is extracted from the input image

308

FIG. 3A

generating, via a trained dual attention (DA) U-Net based on a generative adversarial network (GAN) framework, a recolored product segment of the product recolored based on the selected product segment and the target color, wherein the DAU-Net comprising (a) a product components aware feature extraction (PCAF) to generate feature representations comprising information of the target color, and (b) a critical feature selection mechanism applied on the feature representation, to generate an enhanced feature representations

310 refining, by multiplying the recolored product segment with the product segment mask corresponding to the product segment, the recolored product segment

312 mapping, a refined recolored product segment with the input image, for removing negligible spilling across the recolored product segment, to obtain a target recolored product segment.

METHOD AND SYSTEM FOR RECOLORING A PRODUCT

PRIORITY CLAIM

This U.S. patent application claims priority under 35 U.S.C. § 119 to: Indian patent application No. 202321040918, filed on 15 Jun. 2023. The entire contents of the aforementioned application are incorporated herein by reference.

TECHNICAL FIELD

The disclosure herein generally relates to image processing, and, more particularly, to a method and system for recoloring a product.

BACKGROUND

In the fashion world, color is the most powerful attribute to influence decision-making of a customer. Several industries opt for trademark protection of the color for its ability to increase brand recognition. Choice of the preferred colors for fashion item varies across several customer-specific factors, such as gender, age, and demography. Similarly, different occasions influence the buying pattern of users with specific colors. For example, red and pink colors are popular during Valentine's week. Similarly, red, green, silver, and golden colors are popular during Christmas, etc. Usually, e-commerce websites show fashion items with a set of "color swatch" (i.e., same product with different colors). However, customers avoid purchasing recommended item if the color preference given by the retailer does not match the user preference. It directly leads to poor financial performance by the retailer, unsatisfied customer experience and customer migration. Further, at the design stage, there is lack of resources for recoloring a product and to assess design-color matching combinations.

Image recolorization is an emerging field of research in an image-to-image translation domain. Generative adversarial networks (GANs) play a dominant role in realizing image-to-image translation. Existing image recolorization methods use conditional GAN to control the attributes, such as category and color. However, the generated images for products are not realistic, often missing the finer details and the color mapping is not stable. Further the existing image recolorization methods generate realistic images but possess no control on color while style information often gets changed during transformation. Some of the existing image recolorization methods attempt to separate style and color information, however missing the finer details in the products. Most of the existing image recolorization methods use color palette and target histogram for recoloring. Although this is suitable for natural images, these methods cannot be applied to change one out of multi-colors in images of the products or to keep background color unchanged. Some of the existing image recolorization methods attempt to solve these challenges, however they are limited to pre-defined set of colors and poor rendering of finer details of the products.

SUMMARY

Embodiments of the present disclosure present technological improvements as solutions to one or more of the above-mentioned technical problems recognized by the inventors in conventional systems. For example, in one embodiment, a method for recoloring a product is provided.

The method includes receiving (a) an input image of a product, (b) a target color for generating a recolored product, and (c) a product mask indicating a relevant product to be recolored in a multi-product scenario. The product mask is received only in the multi-product scenario. Further the method includes determining, by using a clustering-based approach, one or more colors in the received input image. Further the method includes obtaining, by using a segmentation-based approach, a segmentation region for each of the one or more colors. The segmentation region comprises a plurality of product segments with associated product segment mask. Further the method includes selecting, by using product mask configured, a product segment from among the plurality of product segments associated with the segmentation region, for the multi-product scenario, wherein for a single-color product and for a multi-color product in a single-product scenario the product segment is extracted from the input image. Further the method includes generating, via a trained dual attention (DA) U-Net based on a generative adversarial network (GAN) framework, a recolored product segment of the product recolored based on the selected product segment and the target color. The DAU-Net comprising (a) a product components aware feature (PCAF) extraction to generate feature representations comprising information of the target color, and (b) a critical feature selection (CFS) mechanism applied on the generated feature representation, to generate enhanced feature representations. The method further includes refining by multiplying the recolored product segment with the product segment mask corresponding to the product segment, the recolored product segment. Further the method includes mapping a refined recolored product segment with the input image, for removing negligible spilling across the recolored product segment, to obtain a target recolored product segment.

In another aspect, a system for recoloring a product is provided. The system comprises a memory storing instructions; one or more Input/Output (I/O) interfaces; and one or more hardware processors coupled to the memory via the one or more I/O interfaces, wherein the one or more hardware processors are configured by the instructions to receive, (a) an input image of a product, (b) a target color for generating a recolored product, and (c) a product mask indicating a relevant product to be recolored in a multi-product scenario, wherein the product mask is received only in the multi-product scenario. Further, the one or more hardware processors are configured to determine, one or more colors in the received input image. Further, the one or more hardware processors are configured to obtain, by using a segmentation-based approach, a segmentation region for each of the one or more colors, wherein the segmentation region comprises a plurality of product segments with associated product segment mask. Further, the one or more hardware processors are configured to select, by using product mask, a product segment from among the plurality of product segments associated with the segmentation region, for the multi-product scenario, wherein for a single-color product and for a multi-color product in a single-product scenario the product segment is extracted from the input image. Further, the one or more hardware processors are configured to generate, via a trained dual attention (DA) U-Net based on a generative adversarial network (GAN) framework, a recolored product segment of the product recolored based on the selected product segment and the target color, wherein the DAU-Net comprising (a) a product components aware feature (PCAF) extraction to generate feature representations comprising information of the target color, and (b) a critical feature selection (CFS) mechanism applied on the generated feature representation, to generate an enhanced feature representations. Further, the one or more hardware processors are configured to refine, by multiplying the recolored product segment with the product segment mask corresponding to the product segment, the recolored product segment. Further, the one or more hardware processors are configured to map, a refined recolored product segment with the input image, for removing negligible spilling across the recolored product segment, to obtain a target recolored product segment.

In yet another aspect, there are provided one or more non-transitory machine-readable information storage mediums comprising one or more instructions, which when executed by one or more hardware processors causes a method for recoloring a product. The method includes receiving (a) an input image of a product, (b) a target color for generating a recolored product, and (c) a product mask indicating a relevant product to be recolored in a multi-product scenario. The product mask is received only in the multi-product scenario. Further the method includes determining, by using a clustering-based approach, one or more colors in the received input image. Further the method includes obtaining, by using a segmentation-based approach, a segmentation region for each of the one or more colors. The segmentation region comprises a plurality of product segments with associated product segment mask. Further the method includes selecting, by using product mask configured, a product segment from among the plurality of product segments associated with the segmentation region, for the multi-product scenario, wherein for a single-color product and for a multi-color product in a single-product scenario the product segment is extracted from the input image. Further the method includes generating, via a trained dual attention (DA) U-Net based on a generative adversarial network (GAN) framework, a recolored product segment of the product recolored based on the selected product segment and the target color. The DAU-Net comprising (a) a product components aware feature (PCAF) extraction to generate feature representations comprising information of the target color, and (b) a critical feature selection (CFS) mechanism applied on the generated feature representation, to generate enhanced feature representations. The method further includes refining by multiplying the recolored product segment with the product segment mask corresponding to the product segment, the recolored product segment. Further the method includes mapping a refined recolored product segment with the input image, for removing negligible spilling across the recolored product segment, to obtain a target recolored product segment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A, and 3B are flow diagrams illustrating the method for recoloring the product, using the system of FIGS. 2A and 2B, in accordance with some embodiments of the present disclosure.

Figure 1:
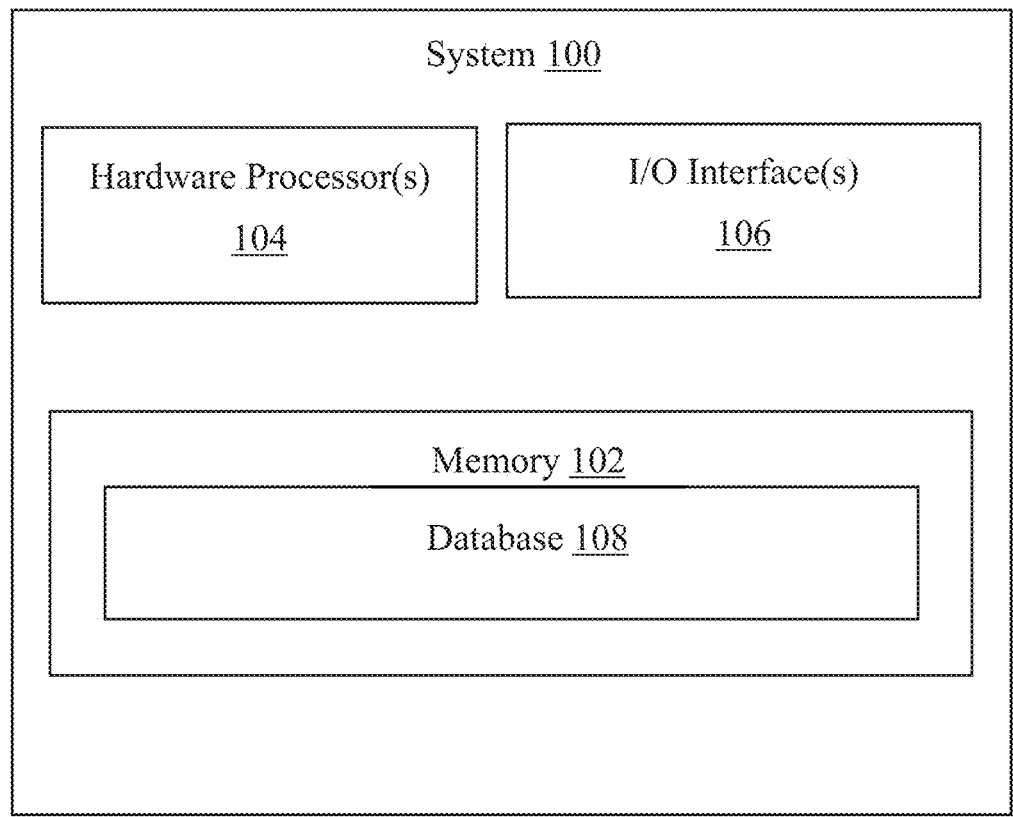
FIG. 1 is a functional block diagram of a system, for recoloring a product, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Existing techniques have challenges for recoloring a product, which results in inferior performance. These include non-realistic images, incorrect color mapping, structural distortion, color spilling into background, and thereof. Further the existing techniques do not handle multi-color and multi-apparel scenario to address image recoloring problem for recoloring the product. The existing techniques such as conventional GAN (Generative adversarial networks) and Pix2Pix in literature (P. Isola, J. Zhu, T. Zhou, and A. A. Efros, "Image-to-Image Translation with Conditional Adversarial Networks", in CVPR, 2017.) use conditional GAN to control the attributes, such as category and color to generate images. However, the generated images for fashion apparels are not realistic, often missing finer details and color mapping is not stable. Further, existing techniques such as StyleGAN ("T. Karras, S. Laine, and T. Aila, "A style-based generator architecture for generative adversarial networks", in CVPR, 2019."), cycle-consistent GANs ("J. Y. Zhu, T. Park, P. Isola, and A. A. Efros, "Unpaired image-to-image translation using cycle-consistent adversarial networks", in ICCV, 2017."), and BiCycleGAN ("J. Y. Zhu et al., "Toward Multimodal Image-to-Image Translation", in NeurIPS, 2017.") generate realistic images, but possess no control on the color while style information often gets changed during transformation. Disentangled GAN attempts to disentangle the style and the color information separately, however, miss finer details in the fashion apparel. Further several existing techniques consider color palettes for recoloring, and it needs paired image for image synthesis. However, these techniques do not work well with unpaired images and with a single-color change. Further some existing techniques such as HistoGAN in literature ("M. Afifi, M. A. Brubaker, and M. S. Brown, "HistoGAN: Controlling Colors of GAN-Generated and Real Images via Color Histograms", in CVPR, 2021.") uses color histogram for automatic image recoloring. However, these techniques do not treat color separately, thereby changing other attributes while changing the color. Furthermore, existing technique such as FAR-GAN separately treat these attributes, however, this technique is not able to generate fine patterns, shadows, folds, and small artifacts in fashion apparel images.

To overcome the challenges of the conventional methods, embodiments of the present disclosure provide a method and system for recoloring the product using a dual attention (DA) U-Net based on a generative adversarial network (GAN) framework to generate a recolored product image based on a target color from an input image. The disclosed DAU-Net enables recoloring (i) the single-color corresponding to a single-color product in a single-product scenario, (ii) a plurality of colors corresponding to the multi-color product in a single-product scenario, and (iii) the single-color or the plurality of colors in a multi-product scenario with a human model. The DAU-Net uses (i) a product components aware feature (PCAF) extraction to generate feature representations comprising information of the target color with finer details, and (b) a critical feature selection (CFS) mechanism applied on the feature representation, to generate enhanced feature representations. The disclosed method takes the input image and the target color as input and generates the product image with the target color, thereby possessing color control without changing structural and style attributes.

Referring now to the drawings, and more particularly to FIG. 1 through FIG. 11, where similar reference characters denote corresponding features consistently throughout the figures, there are shown preferred embodiments and these embodiments are described in the context of the following exemplary system and/or method.

FIG. 1 is a functional block diagram of a system 100, for recoloring the product, in accordance with some embodiments of the present disclosure. In an embodiment, the system 100 may also be referred as DAU-Net or SwatchNet. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100. The one or more processors 104 may be one or more software processing components and/or hardware processors.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, a database 108 is comprised in the memory 102, wherein the database 108 comprises information on the input image of the product, the target color for generating the recolored product, and the product mask indicating a relevant product to be recolored in the multi-product scenario. The memory 102 further comprises a plurality of modules (not shown) for various technique(s) such as a clustering-based approach, a segmentation-based approach, and the like. The memory 102 further comprises modules (not shown) implementing techniques such as the GAN framework, the PCAF extraction and the CFS mechanism. The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
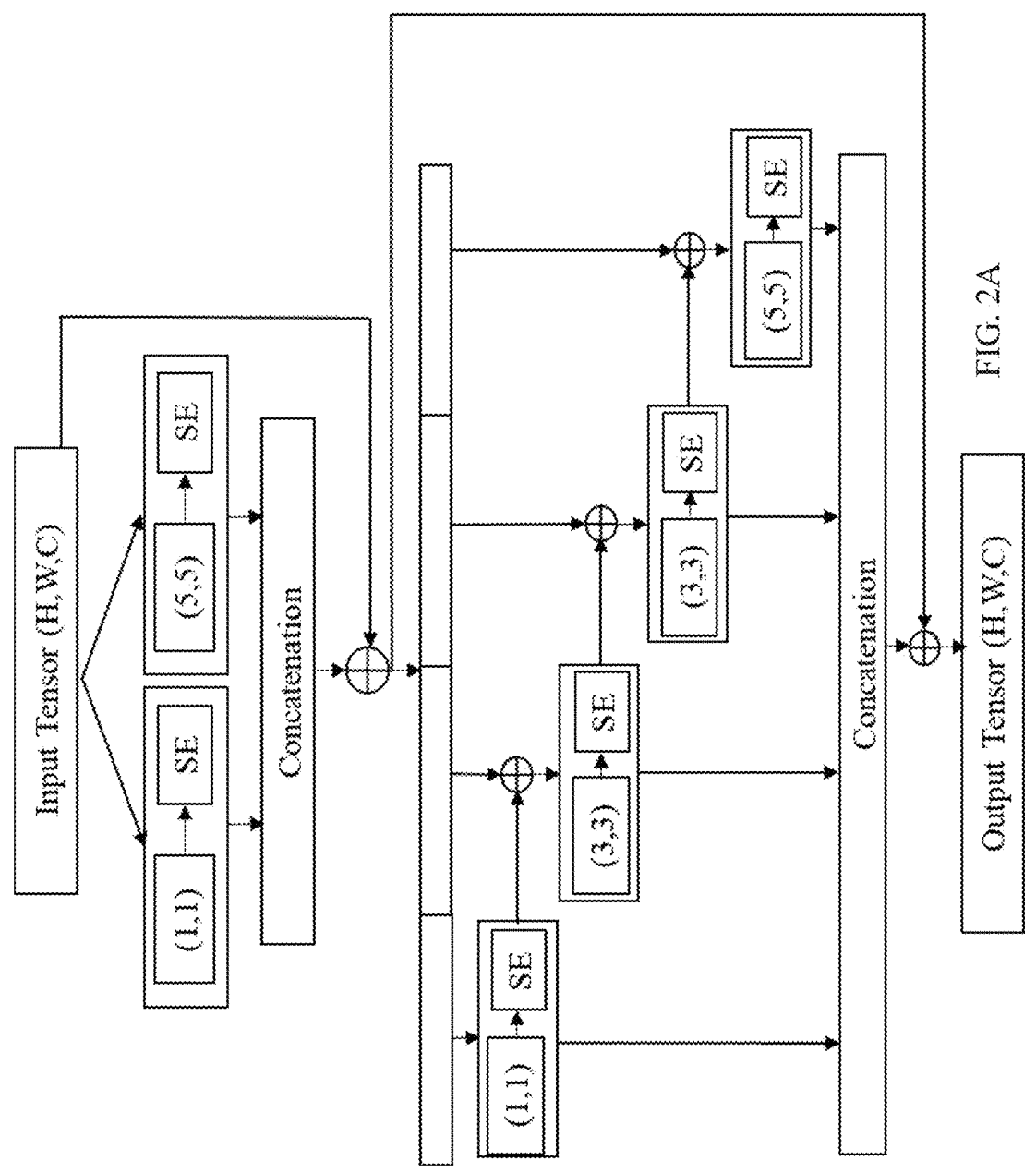
FIGS. 2A, and 2B illustrate functional architecture of the method for recoloring the product implemented by the system of FIG. 1, in accordance with some embodiments of the present disclosure.
Figure 2B:
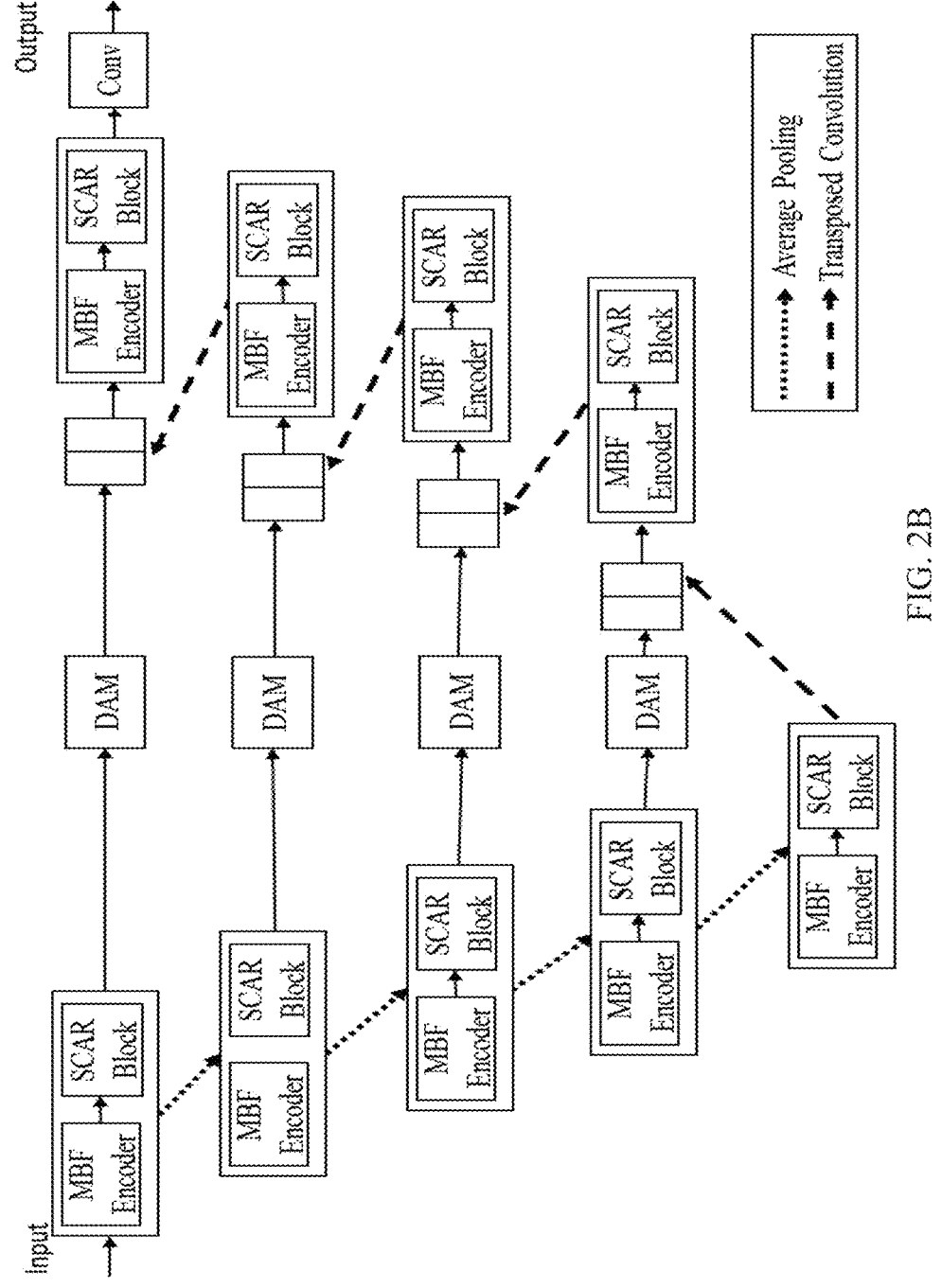

FIGS. 2A and 2B illustrate functional architecture of the method for recoloring the product implemented by the system of FIG. 1, in accordance with some embodiments of the present disclosure. More specifically FIG. 2A illustrates the PCAF extraction to generate the feature representations comprising information of the target color with finer details. The PCAF extraction is composed of 2 parts. The first part of the PCAF extraction as shown in FIG. 2A is a Multi-branch Feature (MBF) Encoder which performs parallel feature extraction for an input tensor (H, W, C) corresponding to the input image using different kernel sizes to aggregate different representations of the product, generating a plurality of key features, wherein in the input tensor, H corresponds to height of the input tensor, W corresponds to width of the input tensor, and C corresponds to number of channels in the input tensor. The second part of the PCAF extraction is a Split-Channel Attentive Representation (SCAR) block which is designed to split the channel and obtain an output tensor (H, W, C) with the feature representations of a plurality of high frequency features and a plurality of low frequency features, from among the plurality of key features obtained from the first part.

More specifically FIG. 2B illustrates the DAU-Net comprising the PCAF extraction to generate the feature representations and the CFS mechanism applied on the feature representation, to generate the enhanced feature representations.

FIGS. 3A and 3B are flow diagrams illustrating the method 300 for recoloring the product, using the system of FIGS. 2A and 2B, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1, FIGS. 2A and 2B and the steps of flow diagram as depicted in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 of the method 300, the one or more hardware processors 104 receive, (a) the input image of the product, (b) the target color for generating the recolored product, and (c) the product mask indicating the relevant product to be recolored in the multi-product scenario, wherein the product mask is received only in the multi-product scenario. Generating the recolored product comprises recoloring based on one of (i) the single-color corresponding to the single-color product in a single-product scenario, (ii) a plurality of colors corresponding to the multi-color product in the single-product scenario, and (iii) the single-color or the plurality of colors in the multi-product scenario with the human model.

At step 304 of the method 300, the one or more hardware processors 104 determine, by using the clustering-based approach, one or more colors in the received input image. For dynamically deciding the one or more colors for the multi-color products, a silhouette coefficient method is used, in accordance with some embodiments of the present disclosure. For dynamically deciding the one or more colors for the single-color or the plurality of colors in the multi-product scenario with the human model, product segmentation maps are used, in accordance with some embodiments of the present disclosure.

At step 306 of the method 300, the one or more hardware processors 104 obtain, by using the segmentation-based approach, a segmentation region for each of the one or more colors including the background. The segmentation region comprises a plurality of product segments with associated product segment mask.

At step 308 of the method 300, the one or more hardware processors 104 select, by using product mask, a product segment from among the plurality of product segments associated with the segmentation region, for the multi-product scenario. For the single-color product and for the multi-color product in the single-product scenario the product segment is extracted from the input image.

At step 310 of the method 300, the one or more hardware processors 104 generate, via a trained dual attention (DA) U-Net based on the GAN framework, a recolored product segment of the product recolored based on the selected product segment and the target color. The DAU-Net comprises (a) the PCAF extraction to generate the feature representations comprising information of the target color, and (b) the CFS mechanism applied on the feature representation, to generate the enhanced feature representations. The PCAF extraction is illustrated in FIG. 2A, in accordance with some embodiments of the present disclosure. The PCAF extraction generate the feature representations comprising features of various frequency components ranging from the plurality of high frequency features to the plurality of low-frequency features using the parallel feature extraction and the SCAR block.

Inception in literature ("C. Szegedy et al., "Going Deeper With Convolutions", in CVPR, 2015.") and Residual in literature ("K. He, X. Zhang, S. Ren, and J. Sun, "Deep Residual Learning for Image Recognition", in CVPR, 2016.") are well-known building elements for deep feature extraction. The inception element increases breadth of a model by capturing high frequency components and low frequency components from the input image by varying the receptive field, whereas the residual element increases depth of the model by incorporating several elements with identity mapping. A depth-wise separable convolution which is similar operation of inception is performed using Xception in literature ("F. Chollet, "Xception: Deep Learning With Depthwise Separable Convolutions", in CVPR, 2017."). However, the Xception lacks the presence of variable kernel size in convolution. ResNext in literature ("S. Xie, R. Girshick, P. Doll'ar, Z. Tu, and K. He, "Aggregated residual transformations for deep neural networks", in CVPR, 2017.") augmented concept of the inception element and the residual element to provide necessary depth and breadth, however, it increases parameters by large extent. Another existing work in literature ("F. Chollet, "Xception: Deep Learning With Depthwise Separable Convolutions", in CVPR, 2017.") applied splitting in channel dimension, like the Xception and adds skip connection to get benefit from both the residual element and the inception element, however, it provides no means to capture different frequency components in different branch and discriminate crucial channels with soft attention. These challenges are addressed by the PCAF extraction, which is composed of two parts. The first part of the PCAF extraction as shown in FIG. 2A is the MBF Encoder which performs the parallel feature extraction for the input tensor (H, W, C) corresponding to the input image using different kernel sizes to aggregate different representations of the product, generating the plurality of key features. For this, two branches having kernel sizes of (1,1) and (5,5) with number of channels as half of input channel are used as shown in FIG. 2A, in accordance with some embodiments of the present disclosure. After convolution, resultant tensors are passed through Squeeze-and-excitation (SE) to highlight crucial features for better discrimination to the small artifacts. Considering the input image as I, the MBF encoder output $Out_m$ is given by:

$$Out_m = Con(SE(Conv(I, 1)), SE(Conv(I, 5))) + I \qquad (1)$$

Where Con represents convolution operation on/with kernel size (k, k) and stride 1. In the SE, two dense layers are used for excitation with number of nodes as (ch/2) and ch, where ch is number of channels after Conv layers.

The second part of PCAF extraction is the SCAR block which is designed to split the channel and extract features of various frequency components ranging from the plurality of high frequency features to the plurality of low-frequency features. In existing techniques all features are extracted using same kernel size. On contrary, in the DAU-Net, a variable kernel size is used without significantly increasing number of parameters for recoloring the product.

The feature representations of the plurality of high frequency features and the plurality of low frequency features are obtained using SCAR, from among the plurality of key features, by varying the kernel size. The obtained feature representations of the plurality of high frequency features with the kernel size are transferred to enhance the plurality of low frequency features for the subsequent kernel size. Further a plurality of key feature maps generated comprises the plurality of high frequency features and the plurality of low frequency features, and each of the plurality of key feature maps is associated to the corresponding kernel size. Further the feature representations of a plurality of critical feature maps are selected from the plurality of key feature maps, by weighing the plurality of key feature maps depending on discrimination ability.

The SCAR block splitting input channels with four parts corresponding to the plurality of key features to obtain feature representations of the plurality of high frequency features and the plurality of low frequency features using different kernel sizes is shown in FIG. 2A, in accordance with some embodiments of the present disclosure. The feature representation outputs represented as M (i), i ∈ [1,4] is given by:

$$M(i) = SE(Conv(Out_p(i), 1)), i = 1 \qquad (2)$$
$$= SE(Conv(M(i-1) + Out_p(i), k)), i = 1$$
$$Out_p(i) = Out_m[i*ch/4: (i+1)*ch/4]$$

where k represents kernel size, k=[1,3,5,7] for i=[1,2,3,4].

Upon generating the feature representations comprising information of the target color, the CFS mechanism is applied on the generated feature representation, to generate the enhanced feature representations. Conventional U-Net gathers information from its corresponding input resolution and its down sampled version during image reconstruction. Because of this, tensors from same resolution doesn't get enough chance to extract required features of products, e.g. buttons, belts, and small patterns of the product. Moreover, attention modules are not present in the conventional U-Net, which have the potential of highlighting the small artifacts. The disclosed DAU-Net addresses both these challenges by using PCAF extraction in encoder and decoder and augmenting the CFS mechanism inside the mapping paths of the encoder and the decoder, to give more chances of extracting small product components and provide visual attention for better synthesis.

The DAU-Net follows the conventional U-Net structure of depth 5, as shown in FIG. 2B, in accordance with some embodiments of the present disclosure. At each level of the DAU-Net the convolution layers are replaced by a convolution layer followed by the PCAF. The convolution layer in the DAU-Net and then the features representations are extracted in detail by the PCAF extraction. Before the feature representations are fed to the decoder of the DAU-Net, the CFS mechanism is applied on the feature representations which selects the plurality of critical feature maps from the plurality of key feature maps and from spatial locations, to generate enhanced feature representations which are discriminatory cues across the spatial locations in the plurality of key feature maps. Transposed convolution is performed in the decoder of the DAU-Net. The plurality of critical feature maps from the plurality of feature representations are obtained by weighing the plurality of key feature maps and spatial-location aware critical feature selection which is performed using spatial average pooling followed by sigmoid activation.

The CFS mechanism of the DAU-Net follows the SE of the PCAF extraction to create channel attention mask $M_c$ using the features representations as input $I_{CFS}$. Performing the spatial-location aware critical feature selection using spatial average pooling followed by sigmoid activation creates a spatial attention mask $M_s$. The output of the CFS mechanism is given by:

$$Out_{CFS} = I_{CFS} * M_c + I_{CFS} * M_s \qquad (3)$$

Figure 4A:
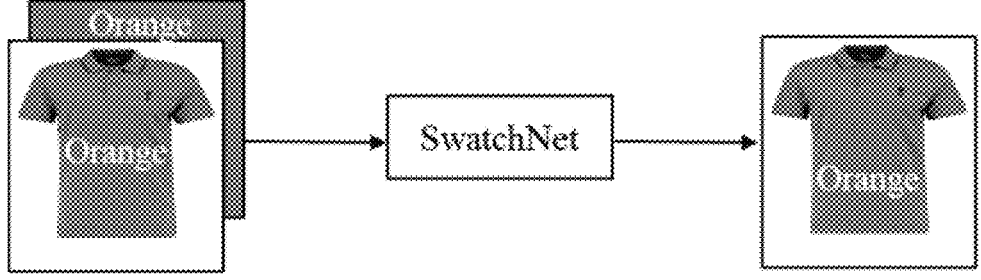
FIG. 4A is a functional block diagram illustrating training of the DAU-Net with an input image of the product and target color for generating a recolored product, in accordance with some embodiments of the present disclosure.

FIG. 4A is a functional block diagram illustrating training of the DAU-Net with the input image of the product and the target color for generating the recolored product, in accordance with some embodiments of the present disclosure. During the training the color of the input image of the product and the target color are same, and the product is the single-color product. The target color input is resized to create same dimension as of the input image to aid concatenation process. The input image is scaled to [−1,1]. The DAU-Net is trained until a minimum loss is obtained to generate the recolored product image with the target color. The DAU-Net is trained based on an adversarial loss and a mean squared error (MSE) loss between the input image and the recolored product image. For training the DAU-Net, an Adam optimizer with learning rate 0.0003 is used, in accordance with some embodiments of the present disclosure. Unlike the existing technique in literature ("G. Bhattacharya, K. Abraham, N. Kilari, V. B. Lakshmi, and J. Gubbi, "FAR-GAN: Color-controlled Fashion Apparel Regeneration", in SPCOM, 2022."), in the DAU-Net, color consistency loss is not used, since the color consistency loss will force all pixels of the product to change to the target color, which will remove shadows, folds and color variation.

At step 312 of the method 300, the one or more hardware processors 104 refine, by multiplying the recolored product segment with the product segment mask corresponding to the product segment, the recolored product segment.

At step 314 of the method 300, the one or more hardware processors 104 map, the recolored product segment with the input image, for removing negligible spilling across the recolored product segment, to obtain a target recolored product segment. The pixels outside the segmentation regions are made same as the background color and recolored pixels of the recolored product segment inside the segmentation region are considered to compute the new color in the given position. The recolored pixels are then brought to the input image for recoloring.

Figure 4B:
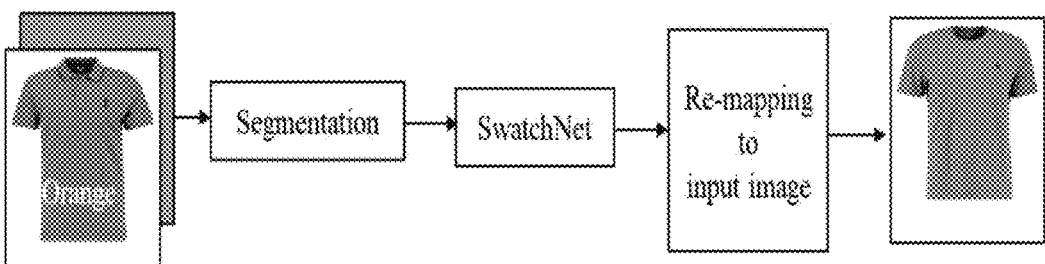
FIG. 4B is a functional block diagram illustrating the trained DAU-Net generating the recolored product with the target color selected by a user, in accordance with some embodiments of the present disclosure.

FIG. 4B is a functional block diagram illustrating the trained DAU-Net generating the recolored product with the target color selected by a user, in accordance with some embodiments of the present disclosure. Generating the recolored product comprises recoloring based on one of (i) the single-color corresponding to the single-color product in the single-product scenario, (ii) the plurality of colors corresponding to the multi-color product in the single-product scenario, and (iii) the single-color or the plurality of colors in the multi-product scenario with the human model.

Figure 5:
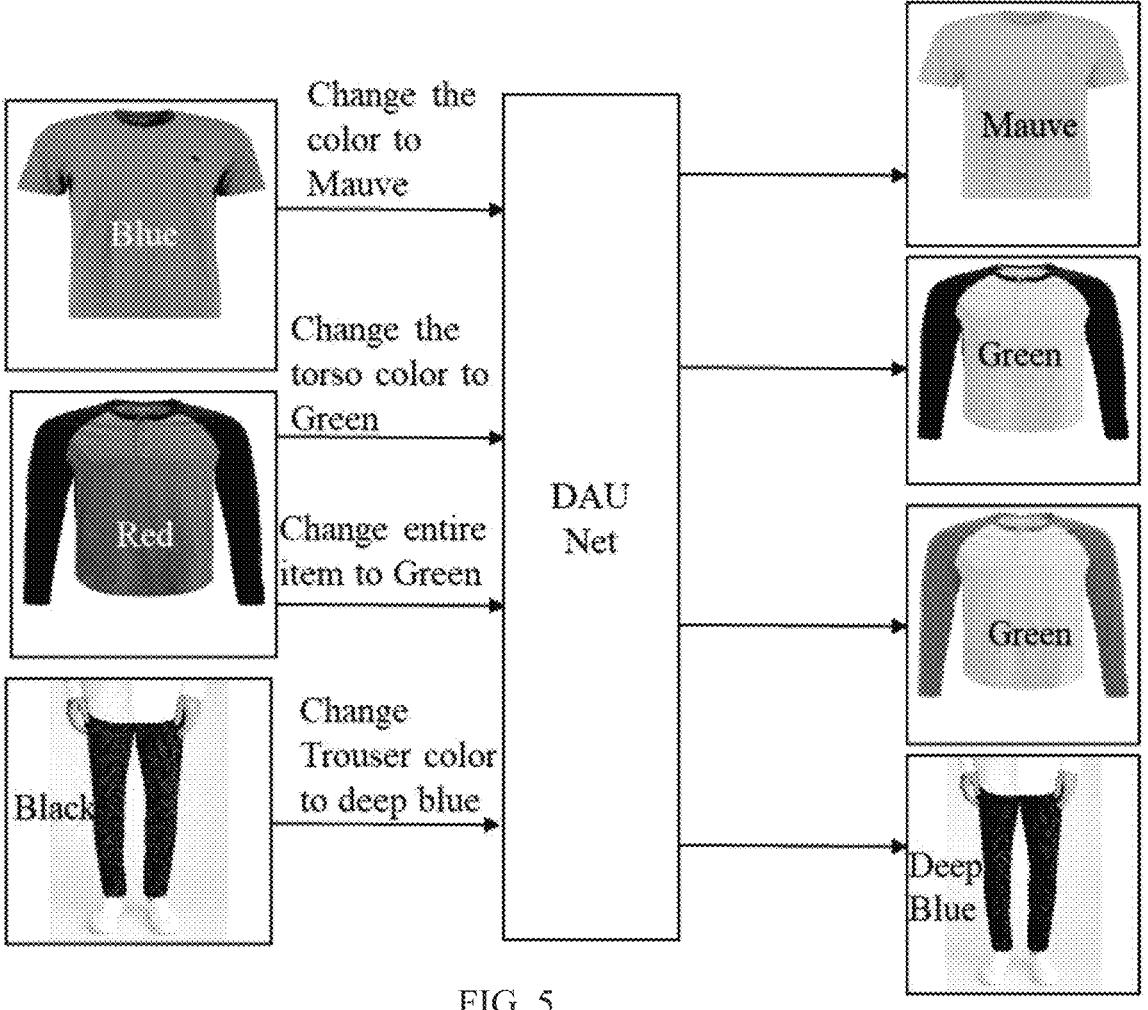
FIG. 5 is a functional block diagram depicting generation of the recolored product based on one of (i) a single-color in a single-product scenario, (ii) a plurality of colors in the single-product scenario, and (iii) the single-color or the plurality of colors in the multi-product scenario with a human model.

FIG. 5 is a functional block diagram depicting generation of the recolored product based on one of (i) the single-color in the single-product scenario, or (ii) the plurality of colors in the single-product scenario, and (iii) the single-color or the plurality of colors in the multi-product scenario with the human model.

Experimental Results

Recoloring the product in fashion domain brings multiple problems, where challenges vary depending on the input images such as patterns, folds, textures in clothing, reflective objects in accessories, texture in shoes, and thereof. Also, testing setup plays a crucial role to complicate the problem, e.g., the single-color or the multi-color products with the background or the single-color or the plurality of colors in the multi-product scenario with the human model. Hence to accommodate all these use-cases to show the efficiency of the disclosed method, four testing setups are identified: T1: the single-color product with the background, T2: the multi-color product with the background where the input image with the single-color (multi-color to one-color palette), T3) the multi-color product with the background where only one color out of multi-colors needs to be recolored, and T4: the product with the human models.

For experimentation, four datasets are used. Part datasets of 3,000 single-color images are created, from Shopping100 k public dataset for clothing, UT-Zappos 50 k for shoes, and Polyvore-accessories for accessories, for creating the test setup (T1). For test setups T2 and T3, 1,000 multi-color images are scrapped each from these datasets. For the Polyvore-accessories, belts, bags, socks, hats, jewelry, watches, sunglasses, etc are considered. For test setup (T4), 1,000 images from DeepFashion dataset with the human model is considered. For training, 2,500 input images from all the datasets are used. The DAU-Net is trained on the Shopping100 k dataset. It is to be noted that separate training of the DAU-Net for the DeepFashion dataset is not needed and have used the trained DAU-Net on the shopping 100 k dataset for inference, since both the datasets contain clothing images. Also, the multi-color images are used for inference with the trained DAU-Net on the corresponding single-color dataset.

For experimentation four baselines are considered: GAN, PaletteNet, BiCycleGAN, and FAR-GAN. For comparison, three performance metrics are considered: Frechet Inception Distance (FID) for evaluating quality of generated image, Dice coefficient, and MSE to compute edge and color consistency, respectively. Dice coefficient is computed after passing the input image and the recolored product through canny edge detector. The MSE is computed by finding the difference between the target and the perceived color. The three-performance metrics are as follows:

$$FID = \|\mu_R - \mu_F\|^2 - T_r\left(\Sigma R + \Sigma F - 2\sqrt{\Sigma R \Sigma F}\right) \quad (4)$$

-continued $$Dice = 2 \times E_R \times E_F / (E_R + E_F) \quad (5)$$

$$MSE = \|I_R - I_F\|^2 \quad (6)$$

$I_R$ and $I_F$ represent real and fake images of the input image respectively. E, $\mu$ and $\Sigma$ represents edge map, mean and variance of input image embeddings.

For comparison, lower is better for the FID and the MSE, and higher is better for the Dice coefficient.

Results on the Shopping100 k dataset: The Shopping100 k dataset provides vast range of clothing images with many variations for male and female with white background. For experiments, the DAU-Net is trained with 2,500 single-color images and then compared the inference performance of the first three test setups. Tables I and II show the comparison the DAU-Net for the single-color product and the multi-color product, respectively.

Table I illustrates performance comparison of the DAU-Net for shopping 100 k single-color product.

TABLE I

| Model | FID | Dice | MSE |
|---|---|---|---|
| Conditional GAN | 176.09 | 0.69 | 0.59 |
| PaletteNet | 184.56 | 0.6 | 0.46 |
| BiCycleGAN | 59.86 | 0.76 | N.A. |
| FAR-GAN | 56.79 | 0.69 | 0.53 |
| DAU-Net (Training) | 23.75 | 0.87 | 0.19 |
| DAU-Net (Inference) | 35.35 | 0.86 | 0.2 |

Table II illustrates performance comparison of the DAU-Net for shopping100 k multi-color product. In the Table II, columns 2, 3, and 4 represent test setup (T2) and columns 5, 6, and 7 represent test setup (T3).

TABLE II

| | Performance Metrics | | | | | |
|---|---|---|---|---|---|---|
| | Changing entire product with the single-color | | | Changing the single-color of the product | | |
| Model | FID | Dice | MSE | FID | Dice | MSE |
| Conditional GAN | 186.96 | 0.49 | 0.65 | 182.75 | 0.49 | 0.68 |
| PaletteNet | 183.86 | 0.57 | 0.41 | 185.76 | 0.59 | 0.41 |
| BiCycleGAN | 57.66 | 0.75 | N.A. | 47.85 | 0.78 | N.A. |
| FAR-GAN | 55.48 | 0.56 | 0.55 | 59.39 | 0.66 | 0.54 |
| DAU-Net | 33.15 | 0.84 | 0.22 | 26.37 | 0.84 | 0.22 |

From Tables I and Table II, it is observed that the disclosed DAU-Net significantly outperforms all the state-of-the-art methods for all three test setups. The closest performance from baselines in structural consistency is being given by the BiCycleGAN. However, the BiCycle-GAN does not possess control on the color. On the other hand, the best color consistency from baselines is given by the PaletteNet. However, the generated images are less 10 realistic than the state-of-the-art. Also, it is observed that the drop in performance from training to testing dataset in Table I is small for the FID and negligible for the Dice and the MSE, signifying that the DAU-Net has learnt the color mapping consistently.

Results on the UT Zappos 50 k dataset: The UT Zappos 50 k dataset is the largest and most popular shoe dataset, consisting of large shoe variations. The training and the inference are performed for first three test setups with the UT Zappos 50 k dataset. In Tables III and IV, the comparison of the DAU-Net for the single-color product and the and multi-color product of shoe images, respectively.

TABLE III

| Model | FID | Dice | MSE |
|---|---|---|---|
| Conditional GAN | 202.21 | 0.65 | 0.61 |
| PaletteNet | 161.23 | 0.55 | 0.34 |
| BiCycleGAN | 84.25 | 0.75 | N.A. |
| FAR-GAN | 155.67 | 0.64 | 0.58 |
| DAU-Net (training) | 50.15 | 0.78 | 0.24 |
| DAU-Net (testing) | 55.32 | 0.77 | 0.26 |

TABLE IV

| | Performance Metrics | | | | | |
|---|---|---|---|---|---|---|
| | Changing entire product with one color | | | Changing one color of the product | | |
| Model | FID | Dice | MSE | FID | Dice | MSE |
| Conditional GAN | 207.41 | 0.61 | 0.63 | 176.42 | 0.6 | 0.61 |
| PaletteNet | 141.89 | 0.52 | 0.28 | 163.18 | 0.51 | 0.31 |
| BiCycleGAN | 80.26 | 0.72 | N.A. | 84.63 | 0.69 | N.A. |
| FAR-GAN | 144.82 | 0.6 | 0.55 | 78.34 | 0.6 | 0.58 |
| DAU-Net | 53.31 | 0.77 | 0.25 | 56.59 | 0.74 | 0.28 |

From Table III and Table IV, it is observed that like the Shopping 100 k dataset, the DAU-Net significantly outperforms all state-of-the-art methods for all the three test setups. Similarly, the negligible drop in performance from training to inference in Table Ill showcase that the DAU-Net has learnt the color mapping consistently. In Table IV, columns 2, 3, and 4 represent test setup (T2) and columns 5, 6, and 7 represent test setup (T3).

Results on the Polyvore dataset: The polyvore dataset consists of clothing, shoes and accessories and is one of the largest datasets for complementary recommendation. A part of the accessories of the polyvore dataset is curated. Tables V and VI show the comparison of the DAU-Net for the single-color product and the multi-color product, respectively. Like other datasets, the DAU-Net significantly outperforms all the state-of-the-art methods for all the three test setups. Also, it is observed that similar trend in the training, the inference performance, and the baseline results.

Table V illustrates performance comparison of the DAU-Net for Polyvore Accessories for the single-color dataset.

TABLE V

| Model | FID | Dice | MSE |
|---|---|---|---|
| Conditional GAN | 127.76 | 0.63 | 0.55 |
| PaletteNet | 116.42 | 0.64 | 0.43 |
| BiCycleGAN | 118.48 | 0.65 | N.A. |
| FAR-GAN | 106.71 | 0.64 | 0.45 |
| DAU-Net (training) | 62.56 | 0.82 | 0.22 |
| DAU-Net (testing) | 80 | 0.75 | 0.25 |

Table VI illustrates performance comparison of the DAU-Net for Polyvore Accessories for the multi-color dataset. In Table VI, columns 2, 3, and 4 represent test setup (T2) and columns 5, 6, and 7 represent test setup (T3).

TABLE VI

| | Performance Metrics | | | | | |
|---|---|---|---|---|---|---|
| | Changing entire product with one color | | | Changing one color of the product | | |
| Model | FID | Dice | MSE | FID | Dice | MSE |
| Conditional GAN | 155.91 | 0.61 | 0.58 | 175.67 | 0.64 | 0.61 |
| PaletteNet | 170.41 | 0.6 | 0.41 | 198.41 | 0.56 | 0.39 |
| BiCycleGAN | 92.02 | 0.66 | N.A. | 110.56 | 0.66 | N.A. |
| FAR-GAN | 158.7 | 0.61 | 0.44 | 107.15 | 0.64 | 0.43 |
| DAU-Net | 82.49 | 0.74 | 0.24 | 80.41 | 0.72 | 0.26 |

Results of the DeepFashion dataset: From the DeepFashion dataset, images where the human model is wearing an outfit and intend to change color of one item from that outfit is considered. The results are given in Table VII. Following the trend of other datasets, the DAU-Net substantially outperformed the state-of-the-art methods, signifying efficacy to even recolor one fashion item in a multi-product scenario with the human model present.

TABLE VII

| Model | FID | Dice | MSE |
|---|---|---|---|
| Conditional GAN | 110.29 | 0.54 | 0.68 |
| PaletteNet | 99.92 | 0.68 | 0.38 |
| BiCycleGAN | 95.18 | 0.81 | N.A. |
| FAR-GAN | 90.56 | 0.77 | 0.45 |
| DAU-Net | 42.46 | 0.86 | 0.25 |

Ablation Study of the DAU-Net: An extensive set of ablation study experiments using the Shopping100 k single-color dataset are conducted, which are tabulated in Table VIII to realize the importance of core components of the DAU-Net. These experiments were focused on the following areas: overall generator block (entire DAU-Net), the MBF encoder, the SCAR block, skip connection between the encoder and the decoder, and a loss function. The experiments are also conducted by changing discriminator, but the performance of the DAU-Net was similar.

To check structure of the overall generator block (rows 2,3,4,5, and 6), the conventional U-Net with 32 filters is used for all Conv layers, the DAU-Net with the SCAR block only, the DAU-Net with only the MBF encoder, the DAU-Net with both the SCAR block and the MBF encoder while excluding the CFS mechanism and the DAU-Net with the SCAR block, the MBF encoder and the skip connection from previous layers. From these results, it is observed that best performance is achieved by putting both the SCAR block and the MBF encoder. Next, ablation on the MBF encoder is performed ablation on the MBF encoder (rows 7-8) by removing the SE block and changing the kernel size of (5,5) by (3,3), while both gave inferior performance. Similarly, ablation is performed on the SCAR block (rows 9-10) by removing the SE and the connection respectively, yielding inferior performance. Then, the CFS mechanism is replaced with Convolutional block attention module (CBAM) and Bottleneck attention module (BAM) (rows 11-12) to prove the hypothesis that a simpler bottleneck layer is better for operation. Finally, the color consistency loss (row 13) is added to prove the hypothesis that it is not required for structural consistency. Table VIII illustrates the ablation study of the DAU-Net using shopping100 k single color-dataset. Parameters (represented as Par in table VIII) in table in order of thousands.

TABLE VIII

| Focus Area | Model | Par | FID | Dice | MSE |
|---|---|---|---|---|---|
| Overall | U-Net | 214 | 45.46 | 0.78 | 0.28 |
| Generator Block | U-Net + SCAR block | 244 | 38.86 | 0.81 | 0.23 |
| | U-Net + MBF Encoder | 341 | 39.57 | 0.82 | 0.25 |
| | U-Net + MBF + SCAR | 370 | 36.26 | 0.84 | 0.23 |
| | U-Net + MBF + SCAR + Skip Connection | 440 | 58.63 | 0.69 | 0.27 |
| MBF Encoder | No SE in MBF Encoder | 407 | 42.41 | 0.79 | 0.24 |
| | (3, 3) instead of (5, 5) | 338 | 38.57 | 0.83 | 0.24 |
| SCAR Block | No SE in SCAR Block | 409 | 71.82 | 0.65 | 0.31 |
| | No skip connection inside | 412 | 48.17 | 0.8 | 0.24 |
| Skip connection | CFS replaced by CBAM | 469 | 38.46 | 0.81 | 0.23 |
| | CFS replaced by BAM | 458 | 41.15 | 0.79 | 0.23 |
| Loss Function | Add color consistency loss | 412 | 98.41 | 0.65 | 0.24 |
| DAU-Net | | 412 | 35.35 | 0.86 | 0.2 |

Cross-dataset analysis: To check if the DAU-Net is generalized for recoloring the product irrespective of the product or object categories, the cross-dataset analysis is performed, considering the Shopping100 k, the UT Zappos 50 k, and the Polyvore single-color datasets for test setup (T1). The results are shown in Table IX. During this analysis, the DAU-Net is trained on one dataset and tested on another dataset. For comparison, testing results are also included on the same dataset it has trained on. From these results, it is observed that the performance does not drop significantly when used different datasets for the training and the inference. Also, the Dice and the MSE values are almost same for the DAU-Net trained on one dataset irrespective of the testing dataset. This shows that the DAU-Net generalizes well in the cross-dataset scenario.

Figure 6:
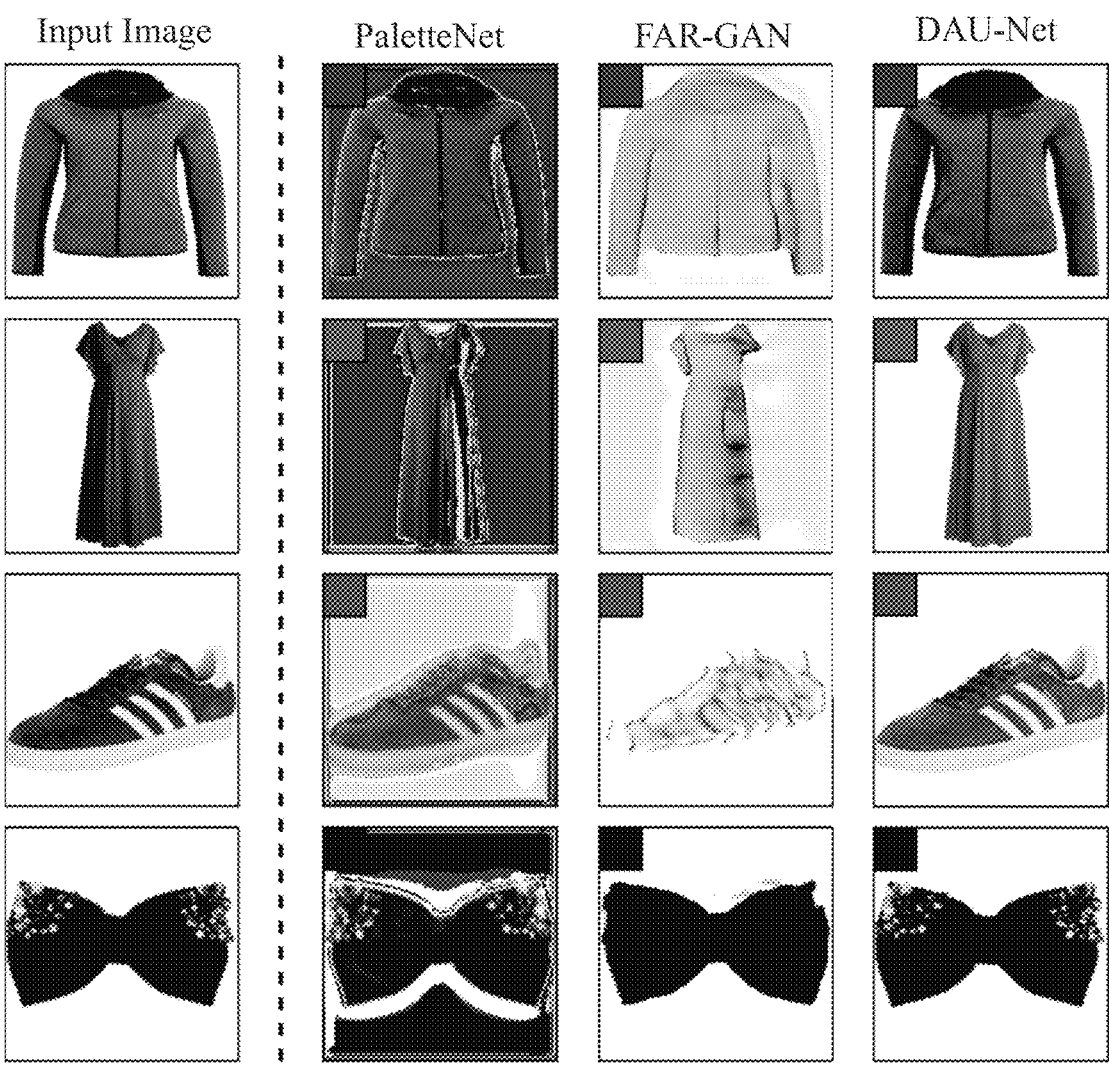
FIG. 6 depicts comparative analysis for recoloring the product using the DAU-Net by the system of FIG. 2B with state-of-the-art techniques, in accordance with some embodiments of the present disclosure.
Figure 7:
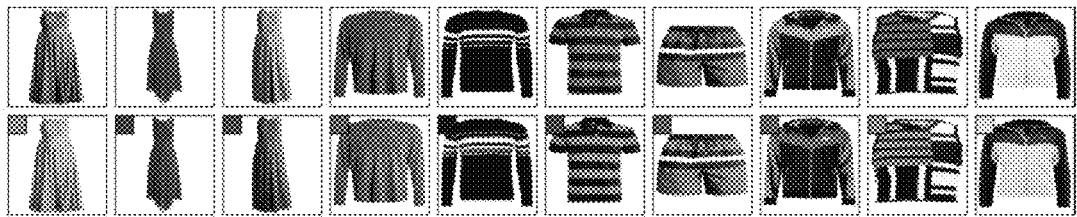
FIGS. 7 through 10 depict experimental results for generating the recolored product using the DAU-Net for different datasets, in accordance with some embodiments of the present disclosure.
Figure 8:
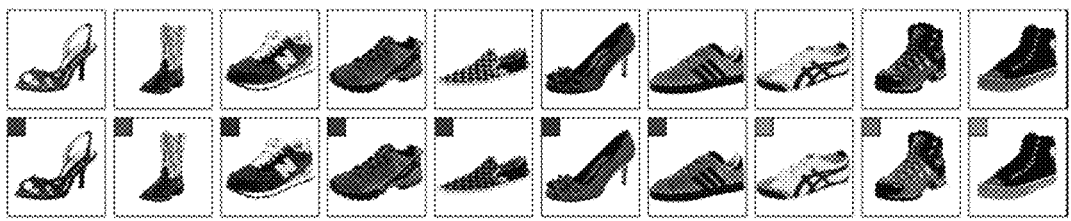
Figure 9:
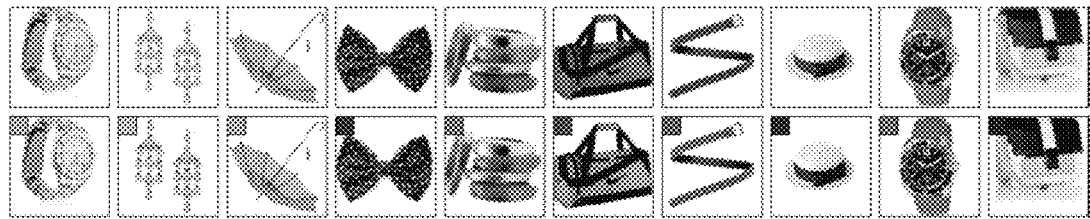
Figure 10:
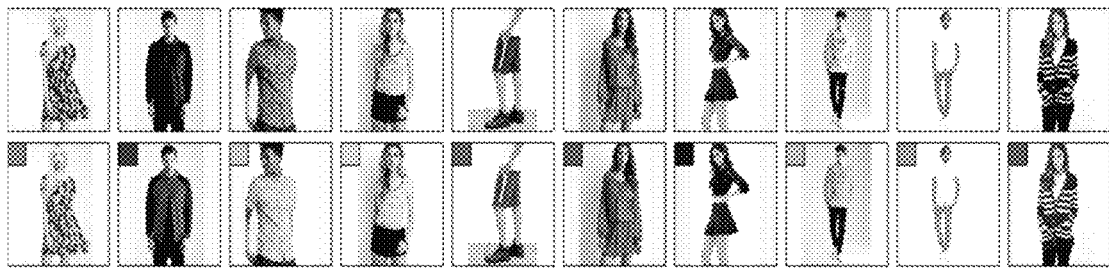

Visual Examples, Comparisons: To showcase the performance of the DAU-Net, visual examples and comparison with the state-of-the-art techniques are demonstrated. Firstly, visual comparison with the two existing methods PaletteNet and FAR-GAN is illustrated in FIG. 6, in accordance with some embodiments of the present disclosure. More specifically FIG. 6 depicts comparative analysis for recoloring the product using the DAU-Net by the system of FIG. 2B with the state-of-the-art techniques, in accordance with some embodiments of the present disclosure. From these results, it is observed that although the PaletteNet captures the target color, background recoloring creates poor rendering. Also, the FAR-GAN maintains coarse structural part, but color mapping is not proper, showing effectiveness of the DAU-Net.

FIGS. 7 through 10 depict experimental results for generating the recolored product using the DAU-Net for different datasets, in accordance with some embodiments of the present disclosure. In FIGS. 7 through 10, first four images follow recoloring single-color product, next three undergo recoloring entire multi-color product with the single-color, last three take one of the multi-colors for recoloring. These results show the DAU-Net ability to perform good color mapping and capture the small artifacts, folds, shadows, etc. for all the test setups.

Figure 11:
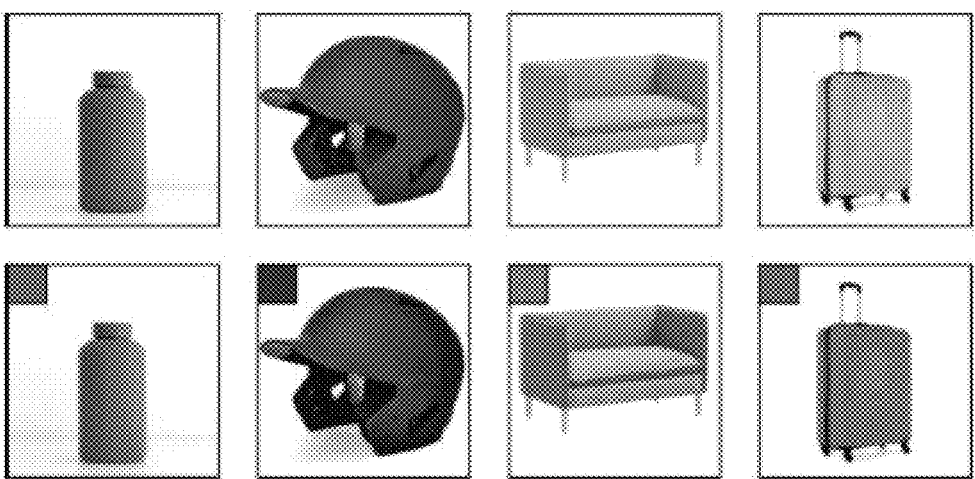
FIG. 11 depicts experimental results for generating the recolored product using the DAU-Net for out-of-dataset images, in accordance with some embodiments of the present disclosure.

To show the generalized performance, out-of-dataset images are considered, such as bottle, helmet, furniture, and trolley bags to perform recoloring as shown in FIG. 11. These results demonstrate the DAU-Net ability to recolor generic products, other than fashion items.

The method disclosed herein is explained for recoloring the product is not limited to fashion apparels. In embodiment the method can be equally applicable for recoloring any object as understood by a person skilled in the art, still being within the scope of the method disclosed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure herein addresses recoloring the product using the dual attention DAU-Net based on the GAN framework to generate the recolored product with the target color from the input image. The disclosed DAU-Net enables recoloring (i) the single-color in the single-product scenario, (ii) the plurality of colors in the single-product scenario, and (iii) the multi-product scenario with the human model. The DAU net uses (i) the PCAF extraction to generate the feature representations comprising information of the target color with finer details, and (b) the CFS mechanism applied on the feature representation, to generate the enhanced feature representations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by one or more hardware processors, (a) an input image of a product, (b) a target color for generating a recolored product, and (c) a product mask indicating a relevant product to be recolored in a multi-product scenario, wherein the product mask is received only in the multi-product scenario;

determining, by using a clustering-based approach executed by the one or more hardware processors, one or more colors in the received input image;

obtaining, by using a segmentation-based approach executed by the one or more hardware processors, a segmentation region for each of the one or more colors, wherein the segmentation region comprises a plurality of product segments with associated product segment mask;

selecting, by using product mask configured by the one or more hardware processors, a product segment from among the plurality of product segments associated with the segmentation region, for the multi-product scenario, wherein for a single-color product and for a multi-color product in a single-product scenario the product segment is extracted from the input image;

generating, via a trained dual attention (DA) U-Net based on a generative adversarial network (GAN) framework executed by the one or more hardware processors, a recolored product segment of the product recolored based on the selected product segment and the target color, wherein the DAU-Net comprising (a) a product components aware feature (PCAF) extraction to generate feature representations comprising information of the target color, and (b) a critical feature selection (CFS) mechanism applied on the generated feature representation, to generate enhanced feature representations;

refining, by multiplying the recolored product segment with the product segment mask corresponding to the product segment executed by the one or more hardware processors, the recolored product segment; and mapping, by the one or more hardware processors, a refined recolored product segment with the input image, for removing negligible spilling across the recolored product segment, to obtain a target recolored product segment.

2. The processor implemented method of claim 1, wherein generating the recolored product comprises recoloring based on one of (i) a single-color corresponding to the single-color product in a single-product scenario, (ii) a plurality of colors corresponding to the multi-color product in the single-product scenario, and (iii) the single-color or the plurality of colors in the multi-product scenario with a human model.

3. The processor implemented method of claim 1, the PCAF extraction generates the feature representations comprising features of various frequency components ranging from a plurality of high frequency features to a plurality of low-frequency features by:

performing, a parallel feature extraction on the product segment using a plurality of kernel sizes, to aggregate the feature representations of the product segment, generating a plurality of key features;

obtaining, by Split-Channel Attentive Representation (SCAR), the feature representations of the plurality of high frequency features and the plurality of low frequency features, from among the plurality of key features, by varying a kernel size, wherein the obtained feature representations of the plurality of high frequency features with the kernel size are transferred to enhance the plurality of low frequency features for the subsequent kernel size, wherein a plurality of key feature maps are generated comprising the plurality of high frequency features and the plurality of low frequency features, and wherein each of the plurality of key feature maps is associated to the corresponding kernel size; and selecting the feature representations of a plurality of critical feature maps from the plurality of key feature maps by weighing the plurality of key feature maps depending on discrimination ability.

4. The processor implemented method of claim 1, wherein at each level of the DAU-Net the convolution layers are replaced by a convolution layer followed by the PCAF, and wherein the convolution layer extracts high-level features from its predecessor followed by extracting the feature representations from the PCAF extraction.

5. The processor implemented method of claim 1, wherein applying the CFS mechanism on the feature representations which selects the plurality of critical feature maps from the plurality of key feature maps and from spatial locations, to generate enhanced feature representations which are discriminatory cues across the spatial locations in the plurality of key feature maps, and wherein the plurality of critical feature maps from the plurality of feature representations are obtained by weighing the plurality of key feature maps and spatial-location aware critical feature selection which is performed using spatial average pooling followed by sigmoid activation.

6. The processor implemented method of claim 1, wherein the training of the DAU-Net comprises:

receiving, (a) the input image of the product, (b) the target color for generating the recolored product, wherein during the training a color of the product image and the target color are same, and wherein the product is the single-color product; and generating, via DAU-Net based on the generative adversarial network (GAN), the recolored product image with the target color until a minimum loss is obtained, wherein DAU-Net is trained based on an adversarial loss and a mean squared error (MSE) loss between the input image and the recolored product image.

7. A system comprising:

a memory storing instructions;

one or more communication interfaces; and one or more hardware processors coupled to the memory via the one or more communication interfaces, wherein the one or more hardware processors are configured by the instructions to:

receive, (a) an input image of a product, (b) a target color for generating a recolored product, and (c) a product mask indicating a relevant product to be recolored in a multi-product scenario, wherein the product mask is received only in the multi-product scenario;

determine, by using a clustering-based approach, one or more colors in the received input image;

obtain, by using a segmentation-based approach, a segmentation region for each of the one or more colors, wherein the segmentation region comprises a plurality of product segments with associated product segment mask;

select, by using product mask, a product segment from among the plurality of product segments associated with the segmentation region, for the multi-product scenario, wherein for a single-color product and for a multi-color product in a single-product scenario the product segment is extracted from the input image;

generate, via a trained dual attention (DA) U-Net based on a generative adversarial network (GAN) framework, a recolored product segment of the product recolored based on the selected product segment and the target color, wherein the DAU-Net comprising (a) a product components aware feature (PCAF) extraction to generate feature representations comprising information of the target color, and (b) a critical feature selection (CFS) mechanism applied on the generated feature representation, to generate an enhanced feature representations;

refine, by multiplying the recolored product segment with the product segment mask corresponding to the product segment, the recolored product segment; and map, a refined recolored product segment with the input image, for removing negligible spilling across the recolored product segment, to obtain a target recolored product segment.

8. The system of claim 7, wherein generating the recolored product comprises recoloring based on one of (i) a single-color corresponding to the single-color product in a single-product scenario, (ii) a plurality of colors corresponding to the multi-color product in the single-product scenario, and (iii) the single-color or the plurality of colors in the multi-product scenario with a human model.

9. The system of claim 7, the PCAF extraction generates the feature representations comprising features of various frequency components ranging from a plurality of high frequency features to a plurality of low-frequency features by:

performing, a parallel feature extraction on the product segment using a plurality of kernel sizes, to aggregate the feature representations of the product segment, generating a plurality of key features;

obtaining, by Split-Channel Attentive Representation (SCAR), the feature representations of the plurality of high frequency features and the plurality of low frequency features, from among the plurality of key features, by varying a kernel size, wherein the obtained feature representations of the plurality of high frequency features with the kernel size are transferred to enhance the plurality of low frequency features for the subsequent kernel size, wherein a plurality of key feature maps are generated comprising the plurality of high frequency features and the plurality of low frequency features, and wherein each of the plurality of key feature maps is associated to the corresponding kernel size; and selecting the feature representations of a plurality of critical feature maps from the plurality of key feature maps by weighing the plurality of key feature maps depending on discrimination ability.

10. The system of claim 7, wherein at each level of the DAU-Net the convolution layers are replaced by a convolution layer followed by the PCAF extraction, and wherein the convolution layer extracts high-level features from its predecessor followed by extracting the feature representations from the PCAF extraction.

11. The system of claim 7, wherein applying the CFS mechanism on the feature representations which selects the plurality of critical feature maps from the plurality of key feature maps and from spatial locations, to generate enhanced feature representations which are discriminatory cues across the spatial locations in the plurality of key feature maps, and wherein the plurality of critical feature maps from the plurality of feature representations are obtained by weighing the plurality of key feature maps and spatial-location aware critical feature selection which is performed using spatial average pooling followed by sigmoid activation.

12. The system of claim 7, wherein the training of the DAU-Net comprises:

receiving, (a) the input image of the product, (b) the target color for generating the recolored product, wherein during the training a color of the product image and the target color are same, and wherein the product is the single-color product; and generating, via the DAU-Net based on the generative adversarial network (GAN), the recolored product image with the target color until a minimum loss is obtained, wherein DAU-Net is trained based on an adversarial loss and a mean squared error (MSE) loss between the input image and the recolored product image.

13. One or more non-transitory machine-readable information storage mediums comprising one or more instructions which when executed by one or more hardware processors cause:

receiving (a) an input image of a product, (b) a target color for generating a recolored product, and (c) a product mask indicating a relevant product to be recolored in a multi-product scenario, wherein the product mask is received only in the multi-product scenario;

determining, by using a clustering-based approach, one or more colors in the received input image;

obtaining, by using a segmentation-based approach, a segmentation region for each of the one or more colors, wherein the segmentation region comprises a plurality of product segments with associated product segment mask;

selecting, by using product mask, a product segment from among the plurality of product segments associated with the segmentation region, for the multi-product scenario, wherein for a single-color product and for a multi-color product in a single-product scenario the product segment is extracted from the input image;

generating, via a trained dual attention (DA) U-Net based on a generative adversarial network (GAN) framework, a recolored product segment of the product recolored based on the selected product segment and the target color, wherein the DAU-Net comprising (a) a product components aware feature (PCAF) extraction to generate feature representations comprising information of the target color, and (b) a critical feature selection (CFS) mechanism applied on the generated feature representation, to generate enhanced feature representations;

refining, by multiplying the recolored product segment with the product segment mask corresponding to the product segment, the recolored product segment; and mapping a refined recolored product segment with the input image, for removing negligible spilling across the recolored product segment, to obtain a target recolored product segment.

14. The one or more non-transitory machine-readable information storage mediums of claim 13, wherein generating the recolored product comprises recoloring based on one of (i) a single-color corresponding to the single-color product in a single-product scenario, (ii) a plurality of colors corresponding to the multi-color product in the single-product scenario, and (iii) the single-color or the plurality of colors in the multi-product scenario with a human model.

15. The one or more non-transitory machine-readable information storage mediums of claim 13, the PCAF extraction generate the feature representations comprising features of various frequency components ranging from a plurality of high frequency features to a plurality of low-frequency features by:

performing, a parallel feature extraction on the product segment using a plurality of kernel sizes, to aggregate the feature representations of the product segment, generating a plurality of key features;

obtaining, by Split-Channel Attentive Representation (SCAR), the feature representations of the plurality of high frequency features and the plurality of low frequency features, from among the plurality of key features, by varying a kernel size, wherein the obtained feature representations of the plurality of high frequency features with the kernel size are transferred to enhance the plurality of low frequency features for the subsequent kernel size, wherein a plurality of key feature maps are generated comprising the plurality of high frequency features and the plurality of low frequency features, and wherein each of the plurality of key feature maps is associated to the corresponding kernel size; and selecting the feature representations of a plurality of critical feature maps from the plurality of key feature maps by weighing the plurality of key feature maps depending on discrimination ability.

16. The one or more non-transitory machine-readable information storage mediums of claim 13, wherein at each level of the DAU-Net the convolution layers are replaced by a convolution layer followed by the PCAF, and wherein the convolution layer extracts high-level features from its predecessor followed by extracting the feature representations from the PCAF extraction.

17. The one or more non-transitory machine-readable information storage mediums of claim 13, wherein applying the CFS mechanism on the feature representations which selects the plurality of critical feature maps from the plurality of key feature maps and from spatial locations, to generate enhanced feature representations which are discriminatory cues across the spatial locations in the plurality of key feature maps, and wherein the plurality of critical feature maps from the plurality of feature representations are obtained by weighing the plurality of key feature maps and spatial-location aware critical feature selection which is performed using spatial average pooling followed by sigmoid activation.

18. The one or more non-transitory machine-readable information storage mediums of claim 13, wherein the training of the DAU-Net comprises:

receiving, (a) the input image of the product, (b) the target color for generating the recolored product, wherein during the training a color of the product image and the target color are same, and wherein the product is the single-color product; and generating, via DAU-Net based on the generative adversarial network (GAN), the recolored product image with the target color until a minimum loss is obtained, wherein DAU-Net is trained based on an adversarial loss and a mean squared error (MSE) loss between the input image and the recolored product image.

\* \* \* \* \*